United States Patent
Schwartz et al.

(10) Patent No.: US 9,697,012 B2
(45) Date of Patent: Jul. 4, 2017

(54) RELATION-BASED IDENTIFICATION OF AUTOMATION OBJECTS

(75) Inventors: Dror Schwartz, Holon (IL); Moshe Eran Kraus, Mazkeret Batya (IL); Amir Kessner, Ramat-Gan (IL); Sagi Monza, Rishon-Lezion (IL); Arnon Mathias, Kfar-Sava (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 1160 days.

(21) Appl. No.: 12/910,025

(22) Filed: Oct. 22, 2010

(65) Prior Publication Data

US 2012/0102461 A1 Apr. 26, 2012

(51) Int. Cl.
G06F 9/44 (2006.01)
G06F 9/455 (2006.01)
G06F 11/36 (2006.01)

(52) U.S. Cl.
CPC ........ G06F 9/4443 (2013.01); G06F 9/45512 (2013.01); *G06F 11/3688* (2013.01)

(58) Field of Classification Search
CPC .................................................. G06F 11/3692
See application file for complete search history.

(56) References Cited

U.S. PATENT DOCUMENTS

| 7,165,240 B2 * | 1/2007 | Patterson | 717/116 |
| 2004/0194054 A1 * | 9/2004 | McGrath et al. | 717/100 |
| 2008/0155514 A1 * | 6/2008 | Couldwell et al. | 717/135 |
| 2008/0313595 A1 * | 12/2008 | Boulineau et al. | 717/101 |
| 2009/0125876 A1 * | 5/2009 | Bixon et al. | 717/101 |

FOREIGN PATENT DOCUMENTS

| CN | 101393528 | 3/2009 |
| JP | 09-223041 | 8/1997 |

OTHER PUBLICATIONS

Selenium, Selenium Documentation—Release 1.0, dated Sep. 27, 2010 (160 pages).
Nitsan Amichai et al., International Application No. PCT/US09/65590 entitled "System and Method for Object Identification in a User Interface" filed Nov. 23, 2009 (30 pages).
Dror Schwartz et al., U.S. Appl. No. 12/814,345 entitled "Scripting Application with Role Identification" filed Jun. 11, 2010 (19 pages).
Dror Schwartz et al., U.S. Appl. No. 12/794,621 entitled "Object Identification Elector" filed Jun. 4, 2010 (22 pages).
Dror Schwartz et al., U.S. Appl. No. 12/907,154 entitled "Adaptive Object Identification" filed Oct. 19, 2010 (28 pages).

(Continued)

*Primary Examiner* — Li B Zhen
*Assistant Examiner* — Lenin Paulino

(57) ABSTRACT

Relationships between a target object and other objects within a software application are identified, where the software application includes an operation to perform on the target object. The relationships are tested to determine relationships that are useful for identifying the target object when the operation is performed on the target object, and a set of useful relationships is generated.

17 Claims, 2 Drawing Sheets

(56) References Cited

OTHER PUBLICATIONS

Chen, Wei et al., Software Testing Process Automation Based on UTP—A Case Study, http://www.springerlink.com/content/p8m3x8g605747748/, Dec. 9, 2005, 13 pages.
Kung, C.H. et al., Design Recovery for Software Testing of Object-Oriented Programs, http://citeseerx.ist.psu.edu/viewdoc/download;jsessionid=8C0C6FD52B2B0704777CA88B3E3C0EDB?doi=10.1.1.50.8669&rep=rep1&type=pdf, Nov. 5, 1992, 24 pages.
Kung, David C. et al., Object-Oriented Software Testing: Some Research and Development, http://portal.acm.org/citation.cfm?id=652403, 1998, 8 pages.
Wong, S.K. et al., Software Testing of the Behavioral Aspects of Objects, http://ieeexplore.ieee.org/iel5/6789/18222/00842333.pdf?arnumber=842333, 1999, 5 pages.

* cited by examiner

RELATION-BASED IDENTIFICATION OF AUTOMATION OBJECTS

BACKGROUND

Automation scripts are generated by recording user interactions with a software application (e.g., a web application). Once the script is created, automation software can be used to simulate the user's interactions with the application by replaying the script. In general, the automation software uses the application during the playback of the script in the same manner as a user would use the application. Objects in the application can be identified and included in the script to enable performance of the application functions. Software automation may be used for various purposes, such as to test a system, or for other purposes.

BRIEF DESCRIPTION OF THE DRAWINGS

Some embodiments are described with respect to the following figures.

DETAILED DESCRIPTION

Figure 1:
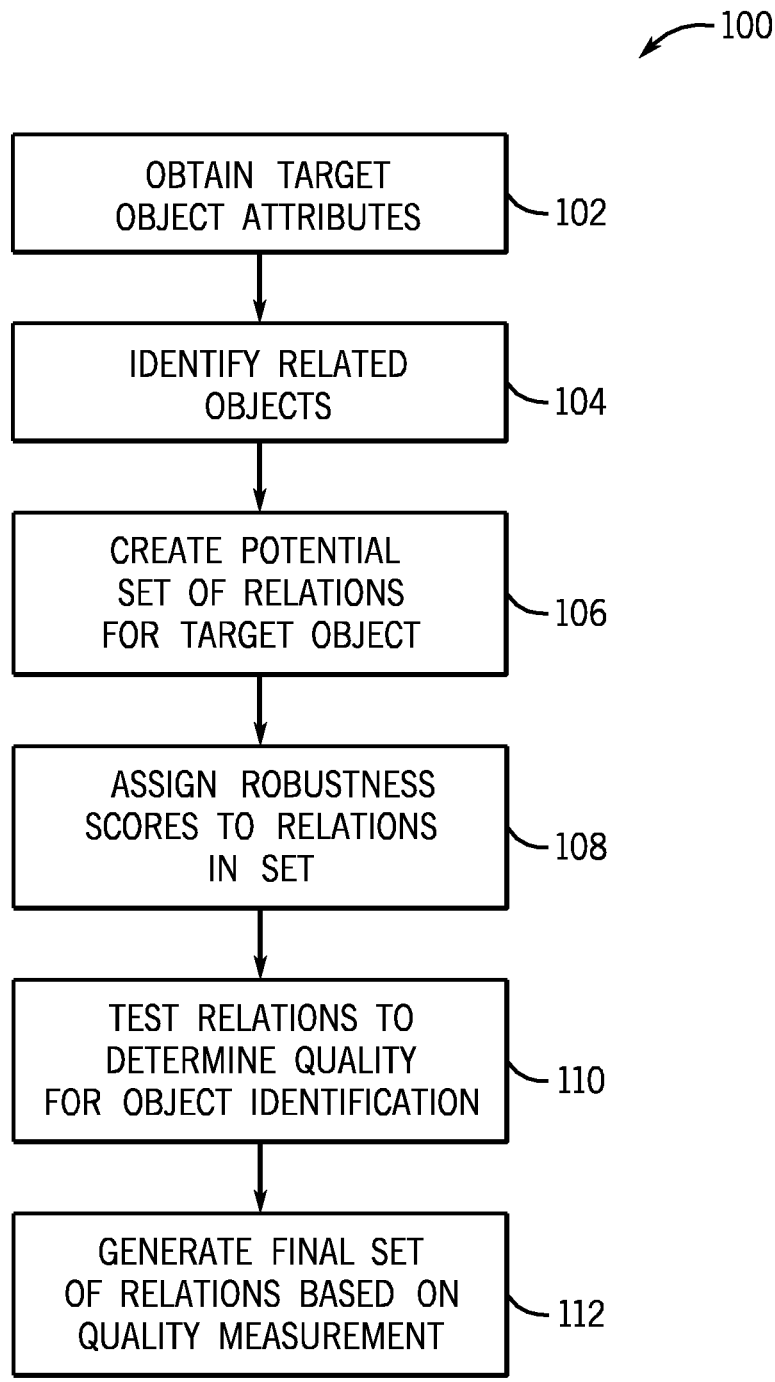
FIG. 1 is a block diagram of a process according to some embodiments.

A software automation system may include an automation model and an automation script that includes a record of actions taken within a software application Execution of the script by the automation system typically involves identifying target objects in the application to which the recorded actions can be applied. For instance, when working with a web application, if the desired automation action is a button click, the automation model can store the text displayed on the button so that the automation system can use that text to identify the button object and simulate the action on the object when the script is replayed.

Generation of such automation scripts may be useful for various testing purposes, such as to perform load testing of a system or to otherwise observe the behavior of the system under typical or expected use of the system. The system can be connected to client devices of various users. In some implementations, the system can be a web-based system, and the client devices can include browsers to access the web-based system. In addition to load testing, other uses for automation scripts include functional testing of a system (to identify possible faults or errors in the system), testing of security features of a system (to determine whether there are any security holes in the system), and/or for other purposes.

An issue with generating automation scripts that represent interactions with an application is that it may be difficult to distinguish or otherwise identify an object acted on within the application at one time so that a corresponding object can be acted on during a subsequent invocation of the application. Identification of objects can be particularly challenging when the application and/or its objects are subject to changes.

For instance, in web applications, traditional object-identifying attributes, such as an identifier or object name, may change over time or even be assigned to a different object, thus presenting difficulties in using such attributes to later locate the object. Likewise, external attributes of the object, such as color, size, text, borders, and the object's location on a display, also may change, thus rendering those attributes of the object unsuitable for definitively identifying the object.

Reliable identification of the object when the automation script is replayed enables the script to invoke the correct objects and act on them accordingly. If an object can not be reliably identified, then the automation script may malfunction and/or return incorrect or unexpected results.

In accordance with some embodiments described herein, systems or techniques are provided to assist with the reliable identification of objects in a software application or document, such as a web application or web page. In some implementations, object identification is facilitated through the use of "relators" that, when provided with a given automation object, automatically detect and identify relationships between the automation object and other objects in the document that may potentially be useful in assisting with identification of the object when the object is invoked at a later time. Once a relationship(s) is(are) identified for an object, the usefulness of the relationship(s) with respect to actually identifying the object is tested. In some implementations, testing usefulness includes identifying those relationships or combinations of relationships that are most relevant to object identification.

FIG. 1 is a flow diagram of a process 100 according to some embodiments. At block 102, identification data (e.g., attributes or characteristics) for an automation object within a document (e.g., a web application, a web page, etc.) is obtained. In some embodiments, the object identification data may be provided entirely or partially by a user. For example, during interaction with the document, the user may be prompted (e.g., via a user interface) to provide or select identifying data for an object when the user interacts with the object.

In other embodiments, the identification data can be obtained automatically by an object identification tool that observes a user's interaction with a document. For instance, upon detection of an operation or action on an automation object, the tool may collect and record attributes of the object at the time of the operation and compile the attributes into an object description. This description can later be used to identify the object whenever it is subsequently invoked. In some embodiments, the description may be based on various attributes/characteristics of the object. These attributes/characteristics may include, for example, visible or external attributes (e.g., color, size, location in a user interface, etc.), non-visible (or internal) attributes (e.g., tags, identifiers, names, paths, location in a document object model (DOM), etc.), and semantic data associated with the object. Because such attributes are often not unique to the object as compared with other objects in the document, the data collected for the automation object may not be sufficient to reliably identify the object at a later time.

In such situations, object identification may be facilitated by examining a given object's relationship with other objects in the document. Accordingly, referring again to FIG. 1, at block 104, once information is collected for the target automation object, a determination can be made as to if and/or which other objects are related to the target object.

As an example, a related object may be easier to identify than a given target object because, for instance, the related object has unique attributes relative to other objects in the document. If the related object can be identified and located, then the target object can be identified based on its relation with the related object. For instance, a text input box object may not have unique attributes compared to other objects in the document and/or its attributes may change each time it is invoked. However, a button object associated with the input box object may have unique attributes (e.g., a text label) that allow the button object to be easily identified. In this example, the text input box is defined so that it will always be displayed to the left/right of the button object, i.e., the objects have a proximity relationship that is static. Accordingly, because the relationship between the button object and the text input box object is static, the relationship may be used to identify the input box object at a later time.

A proximity relationship is only one type of relation that may be used to identify a target object based on identification of a related object. Other types of relations also are possible, including the relative position of objects in a hierarchical tree environment, such as the document object model (DOM) of web pages (e.g., a form containing an input field), and the target object's semantics as gathered by other sources.

With respect to using an object's semantics, in some implementations, a role-based approach is used. For a given object (such as a checkbox in a user interface that can be selected/deselected by a user, or a slider in a user interface that can be moved to change values of a parameter), roles can be assigned by observing types of behaviors. As an example, if a dragged/dropped object moves only horizontally or only vertically (i.e., only one of its x/y coordinates changes), and a value of a nearby text field object changes accordingly, then the behavior indicates that the moved object is semantically acting as a slider and that the nearby text field object is related to the slider object. Likewise, if an object is selected/deselected and a value of a nearby text field object changes accordingly, then one can conclude that the selected/deselected object is semantically acting as a checkbox and the nearby text field object is related. Thus, for instance, if the checkbox object can be identified/located, then the relation between the checkbox and the text field object can be used to identify/locate the text input field object.

In some instances, a directly related object having unique attributes may not be found. In such situations, an attempt can be made to find another object that is related to the related object. If this further object has unique attributes, then the defined relation for the target object may be a series of relations (or a cascaded relation) that includes the relation between the further object and the related object and the relation between the related object and the target object. In some embodiments, a cascaded relation may include several relations that ultimately lead to an object that has unique attributes.

The uniqueness of the attributes of an individual related object may not be the only factor that is taken into consideration when identifying potentially useful relationships. For instance, the uniqueness of a set of objects may also be considered. As an example, a web page may have multiple input text field objects and multiple button objects with the same text. However, the combination of a text field object and the button object next to it may be unique. Accordingly, the uniqueness of the combination of objects can be used to identify a potentially useful relationship.

Returning again to FIG. 1, once relations are identified, then at block 106 a potential set of relations is created. In some embodiments, the relations in the potential set may be ranked in accordance with a robustness level (block 108). Robustness refers to the closeness of the relation between the target object and the related object. For instance, certain types of relations may be considered to be more robust than others. In such embodiments, a robustness score may be predefined for each relation type. As an example, a relation corresponding to a target object's layout on a display device relative to a related object may be considered more robust than a relation that is based on an object's semantics. Thus, all proximity-type relations may be accorded a higher score than all semantic-type relations.

The robustness scores or ranking may be assigned based on predefined rules where a particular score/ranking is predefined for each type of relation. In some embodiments, the predefined rules may include heuristics based on past experiences contained in historical data that has revealed that certain types of relations are more robust than others. In yet other embodiments, the robustness score or ranking may consider and/or be derived from other factors, such as whether the relation is a series of relations, the number of relations in the series, or any other indicator that is useful for evaluating robustness.

In some embodiments, relations may be recursive. This means that an object that participates in a relation with a particular object may also appear in a relation with a different object. An object that appears in multiple relations with different objects may be particularly useful in the identification process. Thus, the number of relations in which a related object participates with other objects may also be a consideration that may be taken into account when determining robustness.

In some embodiments, the rankings may be used to eliminate some of the relations from the potential set. For instance, relations with robustness scores below a predetermined threshold may be discarded from the set. As another example, only a certain number of relations may be included in the set, such as the five (or some other selected number) relations that are at the top of the ranking. The robustness scores may also be considered when testing the quality of the relations in the potential set, as will be explained more fully below.

Referring again to FIG. 1, once the potential set of relations (either with or without a robustness ranking) for an object has been created, the relations within the potential set can be tested to measure their quality (block 110). Here, the quality measurement is indicative of a relation's actual usefulness in the object identification process. In some embodiments, the quality measurement is an actual measurement obtained by heuristic techniques. For instance, the object identification mechanism used by the automation system may determine quality by first attempting to identify an object without using any of the relations in the potential relation set (e.g., object identification is based only on an object description that includes the attributes of the object itself). The object identification process may then repeat using object descriptions that include the relations. The results of object identification using the relations can be compared with the results obtained without the relations to determine whether and/or which relations or combinations of relations in the potential set are, in fact, useful. This process may be repeated using different relations in the potential set or different combinations of relations in the potential set until a final set of relations is found that is deemed most useful for object identification (block 112).

In one example, to facilitate comparison of the results, an identification score may be assigned to each object description (both with and without the relations) that is used to identify/locate the objects. For instance, an object description that results in a match may be assigned a score of "+1," an object description that results in a mismatch may be assigned a score of "−1," and an object description that results in no match may be assigned as core of "0." The identification scores for the object descriptions that do not use the relations may be compared to the identification scores for the object descriptions that do use the relations to determine which object description provides the best results.

In some embodiments, when evaluating cascaded relations where a related object also has related objects, the related object can treated as a single entity so that the related object's identification score using the related object's relations is used to evaluate quality. Alternatively, the related object and its relations may be treated as different entities, each of which has its own identification score. In such a case, the identification scores may be combined into a single score, such as by employing certainty (or other scaling) factors.

It should be understood that other techniques may be used to test the quality of the relations, including techniques that do not compare object identification results obtained with and without the use of the relations. Yet further, the technique may not perform an actual measurement of quality but instead may derive a quality measurement based on other factors, such as, for instance, predefined rules that are based on historical data.

In some embodiments, if robustness ranking/scores are included with the set, the ranking/scores may be used when testing the quality of the relations. For instance, the relations may be tested in an order that is determined by the ranking, highly ranked relations may be tested in combination, and so forth.

In some implementations, the quality of the relations may be tested using a ranking-based object identification technique that is executed during replay of the automation script. In general, during replay of the automation script, when a target automation object is invoked, an object identification module executes to identify candidate objects that may potentially match the target object and evaluate each of the candidates until a match is found. When a ranking-based object identification is employed, identification and evaluation of the candidate objects if facilitated, for instance, by an appraisal ranking or score that is indicative of the likelihood that a candidate object is the target object.

As an example, the appraisal may be generated based on attributes that are associated with the target object, such as a tag name assigned to the object, the location of the object in a document object model (DOM), the display location of the object, display attributes of the object (e.g., color, size, etc.), and so forth, and either a perceived or actual usefulness of each of those attributes relative to object identification. The object identification and appraisal may be based on any one attribute or on any combination of attributes. Candidate objects are then evaluated based on the appraisal of the candidate objects' attributes, and the candidate object with the highest appraisal score is selected as the target object. If the selected candidate object is, in fact, the target object (i.e., the operation is performed successfully on the selected object), then the ranking-based object identification technique has resulted in a match.

This same type of objection identification technique can also be performed using the potential set of relations that have been generated for the particular target object. In an exemplary implementation, object identification is first attempted based only on the attributes of the target object itself and the results (e.g., match, mismatch, no match) are saved. The object identification technique may then be repeated using the relations in the potential set as another factor that can be considered when evaluating the candidate objects. The results of the object identification that includes consideration of the relations in the potential set are saved so that they can be compared to the results that were obtained without the relations. This process may be repeated using different relations and/or combination of relations until a final set of relations that produces the best results (e.g., a successful match, the quickest match, etc.) is identified. This final set of relations may then be used, for instance, when the automation script is replayed in conjunction with a testing tool.

In the foregoing description, quality testing is performed after the potential set of relations has been created. In other implementations, quality testing may be performed as soon as each relation is identified. This process can be repeated, each time increasing the scope of the search for relations until a final set of relations has been established. This technique may be particularly useful in implementations in which the search for relations is a costly process (e.g., in terms of time, processing resources, etc.).

It should be understood that the flow diagram of FIG. 1 has been provided as an illustrative example only and that the technique 100 may include fewer, additional, and/or different steps than those shown in FIG. 1. For instance, at least some of the steps shown in FIG. 1 can be performed in different orders and/or in parallel. As discussed above, quality testing can be performed in conjunction with identification of each relation, quality testing can be performed during record time or replay time or partially in record time and partially in replay time, and so forth.

Figure 2:
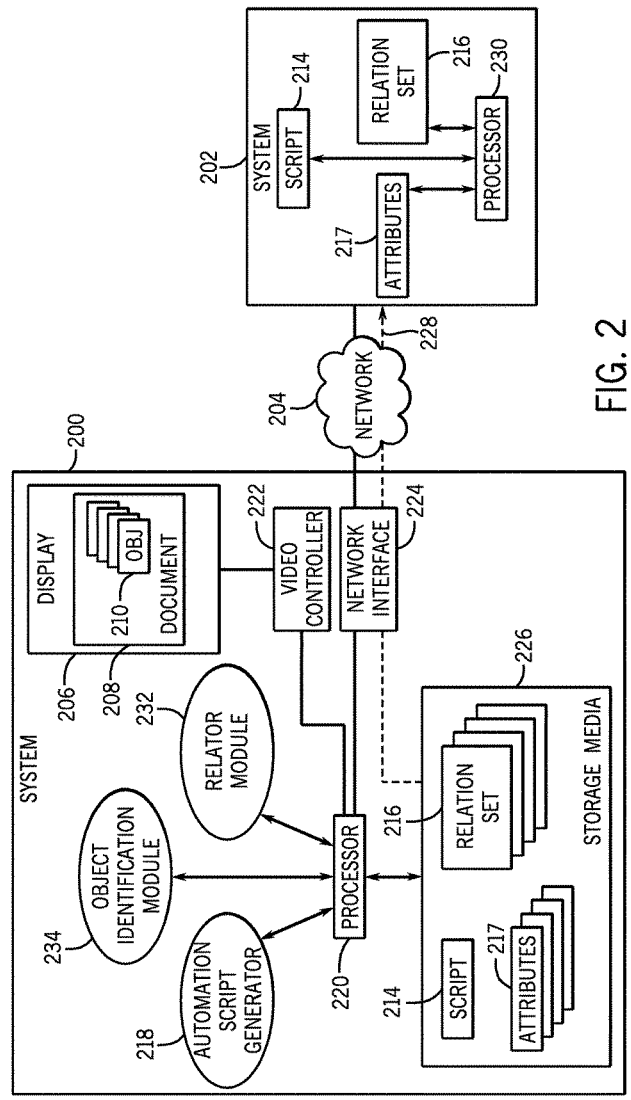
FIG. 2 is a block diagram of an arrangement incorporating some embodiments.

FIG. 2 illustrates an exemplary arrangement in which embodiments of the relation-based object identification technique 100 may be implemented. Referring to FIG. 2, as a non-limiting example, the arrangement includes a system 200 and a system 202 connected over a network 204. In other embodiments, only system 200 may be included and system 202 may be omitted. Alternatively, system 200 may be connected to additional systems 202 or other systems over the network 204. Examples of the network 204 include a local area network, a wide area network, the Internet, or any other type of communications link, and combinations thereof. Examples of the system 200 and 202 include computers (e.g., desktop computers, notebook computers, servers) or other electronic devices, such as personal digital assistants, electronic appliances, and so forth. It should be understood that the location or proximity of system 202 relative to system 200 is not limited in any particular manner and that the systems 200 and 202 may be geographically remote or located in the same room or building, for instance.

The system 200 includes a display device 206 for displaying information 208 (e.g., a document such as a web page) and its associated objects 210 to the user. The system 200 may also include various input devices (not shown) for providing information to the system 200, such as a keyboard, pointing device, touchscreen, and so forth. In an exemplary implementation, the system 200 contains machine executable program instructions and hardware that executes these instructions for the purpose of generating an automation script 214 based on observations of a user interactions with objects 210 included in the documents 208 and displayed on the device 206. The system 200 also includes instructions and hardware that executes these instructions for the purpose of creating relation sets 216 corresponding to the objects 210 that may be employed to identify identify/locate the objects 210 at a later time (i.e., during replay of the script 214). The objects 210 may include any of a variety of structures that include modifiable data and/or programming that operate on the data. The data may describe, for example, a displayable element of the web page 208 (e.g., color, size, border, text, display location, etc.) wherein the displayable element is modifiable or capable of performing an operation in accordance with user input.

In a specific example, the system 200 includes an automation script generator 218 which records user interactions with the objects 210 to generate the automation script 214. The automation script generator 218 is executable on a processor (or multiple processors) 220. The processor(s) 220 is (are) connected to a video controller 222 and a network interface 224. The video controller 222 is coupled to the display device 206 for presenting images on the device 206. The network interface 224 allows the system 200 to communicate over the network 204.

System 200 also includes computer-readable storage media 226 for storing various programs, data, etc. In the exemplary system 200 shown in FIG. 2, the automation script 214, along with the relations 226 and attributes 217, can be stored in the storage media 226. The automation script 214 is capable of execution to replay the corresponding user actions on the objects 210 at a later time using the attributes 217 and/or the relations 226 to identify/locate the objects 210. The automation script 214 can be executed in the system 200, or alternatively, the automation script 214 (along with the attributes 217 and relations 226) can be communicated (see arrow 228) over the network 204 to the system 202 for execution on one or multiple processors 230 of the system 202.

In some examples, the system 200 can be a client device at which users can make various selections or command actions that are captured by the automation script generator 218 of the client device during a recording session. The automation script generator 218 (in conjunction with the object identification module 234 and relator module 232) of each client device can then produce the automation script 214, attributes 217 and relation sets 216 that are sent to a different system, such as system 202, for execution. For example, the system 202 may be a test system designed to perform testing of a system-under-test using the automation script 214.

In alternative implementations, the system 200 is a server system that is connected to multiple client devices. User actions made at the client devices can be captured by the automation script generator 218 in the server system 200. In such implementations, the automation script 214 that is generated by the server system 200 does not have to be communicated to a different system for execution. Instead, the automation script 214 can be executed on the system 200 itself.

During a recording session, operations affecting the document 208 are detected. Operations may include user actions on an object 210 (e.g., a mouse over, a mouse click or other selection of the object, movement of a slider bar, etc.); user actions on an object 210 that affect another object 210 (e.g., a selection of a list item which changes a listbox value); a detectable change of an attribute of the object 210 (e.g., color, size, location, etc.); and so forth. When an operation acting on a target object 210 is detected, the attributes 217 of the object 210 are acquired and can be stored in the storage media 226. The target object 210 and its associated attributes are then passed to a relator module 232 included in the system 200.

The relator module 232, which is executable on the processor(s) 220, considers the target object 210 and looks for other objects 210 within the document 208 that have a relation with the target object 210. In some embodiments, the relator module 232 attempts to identify relations only if the relator module 232 first determines that the attributes 217 corresponding to target object 210 are not unique relative to the attributes 217 of other objects 210 in the document 208. In other embodiments, the relator module 232 identifies relations regardless of whether the attributes 217 associated with the target object 210 are unique. Identified relations are compiled into a potential set 216 of relations that can be stored in the storage media 226. In some embodiments, the relator module 232 also assigns robustness scores to the relations in the potential set 216.

Once the potential set 216 of relations is defined, the quality of the relations may be tested by executing an object identification module 234 (e.g., a ranking-based object identification module). To test the quality, the object identification module 234 replays the automation script 214. When a call for a target object 210 is made, the object identification module 234 attempts to identify/locate the target object 210 based on the attributes 217 (not including the relations in the potential set 216) associated with the target object 210. The object identification module 234 then repeats the object identification process using the relations in the potential set 216 and compares the results with the results obtained without the relations. This process repeats using different relations or different combinations of relations within the potential set 216 until a final set 216 of relations is identified that returns the best results with respect to actually identifying the target object 210 during replay of the automation script 214. This final set 216 of relations may then be used to identify the target object 210 during replay of the script 214, such as in conjunction with a testing tool.

As discussed above, in some implementations, quality testing may be performed as each relation is identified. In yet other implementations, quality testing may be performed entirely during record time or may be performed entirely during replay time. Yet further, initial quality testing may be performed during record time and the resulting set of relations may then be subjected to further quality testing during replay time based on actual results obtained during replay.

The automation script generator 218, the automation script 214, the relator module 232 and the object identification module 234 can be implemented with machine-readable instructions loaded for execution on a processor (such as one or multiple processors 220 or 230 in FIG. 2). A processor can include a microprocessor, microcontroller, processor module or subsystem, programmable integrated circuit, programmable gate array, or another control or computing device. As used here, a "processor" can refer to a single component or to plural components (e.g., one processor or multiple processors).

Data and instructions are stored in respective storage devices (such as storage media 226 in FIG. 2) which are implemented as one or more non-transitory computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method, comprising:
   detecting, by a system having a processor, an operation of a software application performed at a first time on a target object;
   generating, by the system, an automation script containing the operation;
   identifying, by the system prior to execution of the automation script, relations between the target object and other objects within the software application;
   ranking, by the system, the identified relations in accordance with usefulness of each relation with respect to identifying the target object at a later time, wherein the ranking is based on different types of the identified relations;
   eliminating, based on the ranking, at least one of the identified relations to form a subset of the identified relations that excludes the eliminated at least one identified relation;
   testing, by the system, the identified relations in the subset to determine which of the identified relations in the subset are useful for identifying the target object so that the operation can be performed on the target object;
   based on the testing, generating, by the system, a set of the useful relations corresponding to the target object;
   after generating the set of the useful relations, executing the automation script to replay the operation; and
   attempting, by the system, identification of the target object during the replay using the set of the useful relations.

2. The method as recited in claim 1, further comprising:
   acquiring, by the system in response to the detecting of the operation on the target object at the first time, a plurality of attributes associated with the target object,
   wherein testing the identified relations in the subset comprises:
      first attempting, by the system, identification of the target object using the attributes without using the subset of identified relationships;
      second attempting, by the system, identification of the target object using the subset of identified relationships;
      comparing results of the first attempting with results of the second attempting; and
      identifying the useful relations based on the comparing.

3. The method as recited in claim 1, wherein the types of the identified relations comprise a proximity of the target object to a related object displayed on a display device and a relative position of the target object to the related object in a source code hierarchy.

4. The method as recited in claim 1, further comprising:
   acquiring, by the system, a plurality of attributes associated with the target object at the first time;
   determining, by the system, whether any of the acquired attributes are unique as compared to attributes of the other objects within the software application; and
   identifying the relations between the target object and the other objects only if none of the acquired attributes are unique.

5. An article comprising at least one non-transitory computer-readable storage medium storing instructions that upon execution cause a system having a processor to:
   receive an automation script containing a representation of an operation performed at a first time on a target object within a software application;
   prior to executing the automation script to replay the operation on the target object, generate a set of relationships between the target object and other objects within the software application;
   receive attributes of the target object that the target object had at the first time; and
   first attempt to identify the target object using the attributes without using any of the relationships;
   second attempt to identify the target object using the relationships;
   compare results of the first attempt with results of the second attempt;
   refine the set of relationships based on the compared results; and
   after refining the set of relationships, execute the automation script to replay the operation on the target object using the refined set of relationships to identify the target object during the replay.

6. The article as recited in claim 5, wherein the instructions upon execution cause the system to further:
   rank the relationships in the set of relationships in order of likelihood that corresponding ones of the relationships can be used to identify the target object during execution of the automation script.

7. The article as recited in claim 6, wherein the ranking is based on different types of the relationships, wherein the ranking is used to eliminate relationships from the set.

8. The article as recited in claim 5, wherein the instructions upon execution cause the system to further:
   determine whether the attributes of the target object are unique as compared to attributes of the other objects within the software application; and
   use the set of relationships to identify the target object only if none of the attributes of the target object are unique.

9. A system, comprising:
   a storage media configured to store an automation script containing a representation of an operation performed on a target object within a software application, and attributes of the target object at a time of the operation; and
   at least one processor configured to:
      prior to executing the automation script to perform a replay of the operation on the target object, identify relations between the target object and other objects within the software application;
      rank, based on different types of the identified relations, the identified relations in order of likelihood that the corresponding relations can be used to identify the target object during the replay;
      eliminate at least one of the identified relations to form a subset of the identified relations that excludes the eliminated at least one identified relation;
      test the identified relations in the subset to determine which of the identified relations in the subset are useful for identifying the target object;
      based on the testing, generate a set of the useful relations corresponding to the target object;

after generating the set of the useful relations, execute the automation script to perform the replay of the operation on the target object; and attempt to identify the target object by using the set of the useful relations during the replay.

10. The system as recited in claim 9, wherein the at least one processor is configured to further measure quality of the identified relations according to actual usefulness of corresponding relations towards identifying the target object during execution of the automation script.

11. The system as recited in claim 9, wherein the at least one processor is configured to perform the testing by:

first attempting to identify the target object using the attributes of the target object without using the identified relations in the subset;

second attempting to identify the target object using the identified relations in the subset;

comparing results of the first attempting with results of the second attempting, wherein generating the set of the useful relations is based on the comparing.

12. The method of claim 1, wherein the ranking ranks a first of the different types of the identified relations higher than a second of the different types of the identified relations.

13. The method of claim 12, wherein the ranking is according to predefined rules that specify ranking scores for respective ones of the different types of the identified relations.

14. The method of claim 12, wherein the first type of the identified relations is a recursive relation, and the ranking ranks the recursive relation higher than the second type of the identified relations.

15. The method of claim 1, wherein the set of useful relations is selected from the subset of identified relations based on the testing.

16. The article of claim 5, wherein refining the set of relationships comprises selecting a subset of the set of relationships.

17. The system of claim 9, wherein the ranking ranks a first of the different types of the identified relations higher than a second of the different types of the identified relations, and the ranking is according to predefined rules that specify ranking scores for respective ones of the different types of the identified relations.

* * * * *